Dec. 6, 1938. T. E. BROCKSTEDT 2,139,057
RADIO APPARATUS AND METHOD
Filed April 20, 1932 2 Sheets-Sheet 2
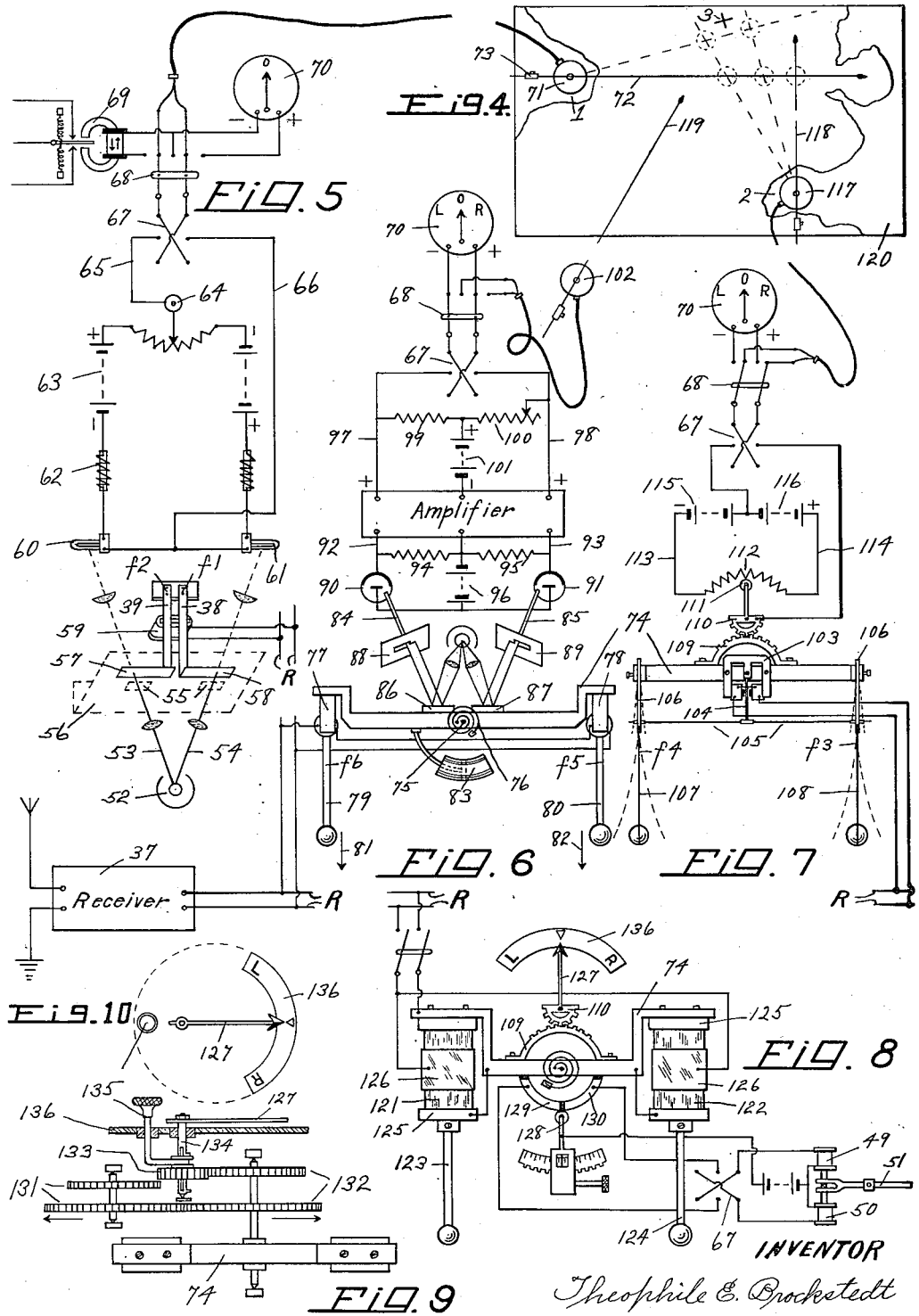

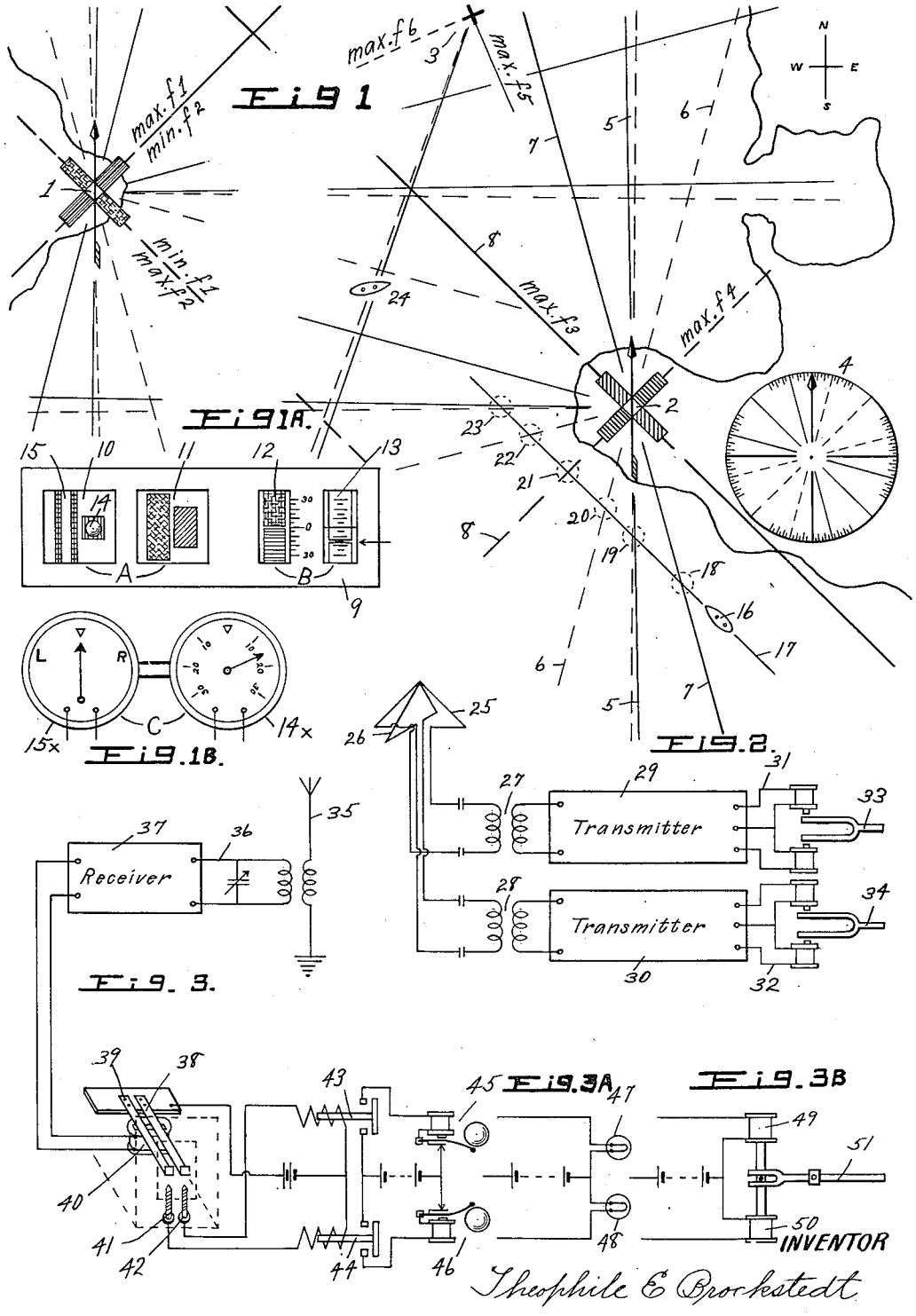

Patented Dec. 6, 1938

2,139,057

UNITED STATES PATENT OFFICE 2,139,057

RADIO APPARATUS AND METHOD

Theophile E. Brockstedt, San Francisco, Calif., assignor to Washington Institute of Technology, Inc., a corporation of Delaware Application April 20, 1932, Serial No. 606,403

12 Claims. (Cl. 250—11)

This invention, concerned with aids to navigation, particularly through directional transmission of radio signals and the automatic translation thereof at the receiving station, is a continuation-in-part of my copending application Serial No. 151,915, filed December 1, 1926, Patent No. 1,865,826, July 5, 1932, as to all matter common to the two applications.

Practical and successful prior art radio aids to navigation are with few exceptions based on methods requiring directional reception of signals in one form or another either on a moving body or at fixed stations. The herein described invention is based on methods requiring directional transmission of signals. My methods and apparatus for utilizing directively transmitted signals, produce a number of new and highly desirable results in the art of navigation and also in the art of automatically controlling the operation of apparatus remote from the source of directive signals. The methods embodied in my invention are fundamental and are directed to the advancement of the several arts involved without limitations to form as applied to marine or aerial navigation, the guidance and control of rockets in flight, or the performance of the general functions of remote type instruments.

One method embodied in my invention, disclosed in the above identified application, is that of determining position of a moving craft relative to a plurality of directive signal transmitting stations located in different geographical positions.

Another object of my invention is to provide relay and control apparatus of general utility for translating, integrating, and manifesting the composite resultant of the groups of directive signals received from a plurality of transmitting stations.

Further improvements in indicators, methods, and apparatus are pointed out in the course of description.

Fig. 1 is a diagrammatic illustration of the directional characteristics of the composite signals propagated by a pair of directive radio beacons.

Fig. 1—A shows a plurality of visual reed indicators.

Fig. 1—B shows a plurality of pointer type indicators.

Fig. 2 is an illustration of the beacon antenna system with associated transmitting apparatus.

Fig. 3 is a diagram of a visual reed indicator mechanism with associated general purpose relay circuits for controlling mechanisms automatically in accordance with the relative magnitudes of the directional signals received.

Fig. 3—A represents signal apparatus.

Fig. 3—B represents a steering apparatus adapted for automatic operation by the radio beacon signals.

Fig. 4 is an illustration of a method and apparatus for automatically indicating and determining positions in miniature over a chart or map of suitable scale on a moving body in accordance with the characterized signals received from two or more directive radio beacons.

Fig. 5 illustrates a form of differential photoelectric control apparatus in which a pair of vibrating reeds are utilized to act as shutters between a source of light and a pair of selenium cells and associated apparatus.

Fig. 6 shows a form of differential light relay control apparatus in which the dynamic or centrifugal forces developed by a pair of vibrating reeds are utilized to vary the movement of two beams of light arranged to fall differentially upon a pair of photoelectric cells with associated apparatus.

Fig. 7 shows a species of the invention wherein the dynamic forces developed by the vibrating reeds are arranged to act on a balance beam which by its differential movement varies the resistance in a pair of branch circuits with associated apparatus.

Fig. 8 is a species of the invention wherein the bridge circuits shown in Figs. 5, 6, and 7 are eliminated by coupling the indicator pointer directly to a differential balance beam which is actuated by a pair of vibrating reeds driven by a pair of piezoelectric crystals.

Fig. 9 is a plan view of a train of gears including a gear-shift, and which train is associated with the apparatus shown in Fig. 8 for the purpose of reversing the sequence of actuation of the indicator pointer when desired. The gearshift in this illustration performs the function of the reversing switches shown in Figs. 5, 6, and 7.

Fig. 10 is a view of the indicator associated with the apparatus shown in Fig. 9.

Fig. 1 may be viewed as a nautical chart of the usual scale employed in practice. 1 and 2 are symbols representing directive radio beacons and are printed in appropriate size on the chart to indicate the exact location of the beacons. The symbols are printed in colors to conform to a particular scheme designed to facilitate use of this signal system. The symbols preferably include an arrow or the like to indicate the orientation of the directive antenna system in accordance with a standard system of directional signal orientation. The lines radially projected from the symbols 1 and 2 represent the characteristic signal zones, and while shown for the purpose of this description, some of these lines may be printed on the chart to advantage where conditions of navigation are particularly dangerous. The pilot may project on the chart such lines as he may require by means of the protractor 4 which is constructed of transparent material having the signal characteristics and a scale engraved thereon which may be placed over and properly oriented with the symbol representing a particular beacon. The beacons represented in the drawings are of the four course or four equisignal variety but it is not material to the scope of my invention whether beacons of the one course, two course, four course, or twelve course variety are employed in practice. The double lines such as shown at 5 represent the equisignal zones. For further illustration, lines such as 6 and 7 have been drawn 15 degrees to their respective sides of the equisignal zones. Lines 8 represent the planes of the transmitting loop antennas and indicate the position of the lines or zones of maximum signal intensity.

Since the loop antennas are arranged at rightangles to each other in the present illustration, the lines of minimum signal intensity from one loop antenna fall on the lines of maximum signal intensity of the other loop antenna. This relative position of the maximum and minimum signal zones from a particular beacon will of course be changed when the antennas are arranged at other angles to suit local conditions of navigation. Radio carrier waves, preferably of the same oscillation frequency, are propagated by the directional antennas and each of these waves are modulated by sustained pulsations of different audio frequencies to characterize and distinguish said waves. Each of the different modulation frequencies employed in the system are distinguished in graphical representations thereof by a distinctive color in conformity with the color scheme employed with respect to the beacon symbols. The beacon symbols such as 1 and 2, printed on the chart in colors, show the pilot at a glance which of the standardized modulation frequencies are employed at a particular beacon; in what directions their maximum directive effect is encountered; and how to properly utilize the hereinafter described apparatus to direct and guide the craft in accordance with the directively transmitted signals.

An indicator panel is shown at 9 in Fig. 1A on which the visual reed indicators 10, 11, 12 and 13 are exposed to view. Signal indicators of the pointer type are shown at 14x and 15x in Fig. 1B. The indicator flags mounted on the free ends of the reeds as shown on the panel have each been given a different color which corresponds with one of the colors of the symbols representing particular beacons, and incidently, the colors of the reed flags show to which modulation frequencies the individual reeds are tuned to respond by resonant vibration. The color scheme of this system makes for simplicity and convenience in use of the apparatus.

To make the differently colored reed flags uniformly visible I have devised an improvement to accomplish this result. On the reed flags shown at 10 I have fastened a convex spherical mirror 14 which is a more efficient reflector of light than the plain white reed flag in common use. When the reeds are in vibration, brilliant lines are described by the convex mirrors as shown at 15. Other known materials may be used to produce the brilliant effect. This optical effect is further extended in the case of indicators 11, 12, and 13 where the reed flags constitute plane mirrors constructed of glass of different colors. The glass may be rendered partially translucent to suppress glare of the reflected light. When the reeds at 11, 12, and 13 are in vibration they describe brilliant bands of different colors, the lengths of which bands are determined by the amplitude of vibration of the reeds. When the reeds are in vibration the flags oscillate through an arc in the plane of vibration thus causing the plane mirrors to produce the virtual effect of extended convex mirrors. To ensure uniform brilliance throughout the length of the colored bands described by the plane mirrors, illumination is supplied to the mirrors from suitable angles to effect the desired result.

The indicators at 12 and 13 show the reeds arranged to vibrate in a single plane which may be vertical as shown, or horizontal. Automatic volume control of the receiver output is desirable with this arrangement of the reeds. In practice, the relative vibratory amplitudes of the reeds are so controlled with respect to the receiver output voltages that the reeds just fail to strike together. Since the relative vibratory amplitudes of the reeds increase and decrease inversely in accordance with the response to the beacon signals received, the sharp dividing line between the different colors of the reed flags is caused to move along the scale shown on panel 9 in accordance with the relative intensities of the beacon signals received. The scale is marked in degrees to indicate the angular displacement of the receiver to the right or left of a given equisignal zone. The indicator 13 shows the scale engraved on the window of the panel through which the dividing line of the colored reeds may be readily observed. This arrangement of the reed indicator is designed to perform the function of the pointer type indicator shown at 14x but by far simpler means. The pointer type indicators have their field of usefulness as will be pointed out.

The indicators shown from 10 to 15x are arranged in groups A, B, and C. The two or more indicators in each group represent two or more beacons operating in that group and transmitting signals preferably on the same wave length simultaneously. Thus, for example, if the beacons represented at 1 and 2 in the drawings function in the group B, then in that case the modulation frequencies of beacons 1 and 2 cause simultaneous resonant vibration of the four reeds shown at 12 and 13. The reed flags are given the colors of the symbols representing their respective beacons. The indicator 13, for example, shows the angular displacement of the craft with respect to beacon 2, and in like manner indicator 12 gives the bearing of its respective beacon 1 from the craft. The two bearings from the two beacons are coordinated in the usual manner and the position of the craft determined. This feature of the invention which constitutes a new use of the modulation type directive radio beacon is further embodied in the method and apparatus illustrated in Fig. 4 where the bearings or lines of position are continuously projected and coordinated over a chart or the like to indicate the position of the craft continuously in miniature, thus eliminating the usual work necessary in taking bearings and plotting positions in the manner commonly practiced with radio direction finders and radio compass stations.

The directive radio beacon system is not limited to serving its own purpose as a radio course projector alone, but may be used in the practice of old methods of pilotage as well. For example, the vessel 16 is proceeding along the course 17, Fig. 1. When the vessel is at a position 18 the reed indicator will show, as for example at 13 on the panel 9, that the vessel is on a line of position fifteen degrees to one side of the equisignal zone 5. The equisignal zones are the lines of reference. When the vessel is located at 19 on the equisignal zone 5, this fact will be shown as by the reeds on indicator 12. By determining the distance run between the positions 18 and 19, and determining the angles formed between the course 17 and the first and second bearings or lines of position by means of the protractor 4, the distance of the vessel from the beacon may be determined by calculation, or by means of a nautical table existing for the purpose, or by a simple graphic method well known to navigators. The subsequent positions 20 to 23 may be determined in like manner. At the position 20 the beacon signal indicator will give an indication as shown at 11 on the panel. At 21 the vessel will be on the line of maximum and minimum signals from the beacon and the indicator 10 shows the reed 15 vibrating with maximum amplitude while the reed 14 vibrates with minimum amplitude. The position 22 gives an indicator reading as shown at 14x, and at position 23 the vessel is again on an equisignal zone and the indicator reads as shown at 15x. When the vessel is in the position 24 where cross-bearings can not be had from beacons 1 and 2, a third beacon 3 may be provided when necessary, and an additional indicator provided on the panel 9.

Fig. 2 shows the antenna system comprising loop circuits 25 and 26 which propagate carrier waves of the same oscillation frequency and are coupled to their respective wave generators 29 and 30 through transformers 27 and 28. The carrier waves generated at 29 and 30 are modulated by sustained pulsations of different audio frequencies generated in the circuits 31 and 32 by audio frequency standards 33 and 34. Any suitable frequency standards may be used in place of the tuning forks shown. The vibrating reeds of the indicators and the relays herein described are tuned to the different frequencies of the tuning forks 33 and 34 at their respective transmitters. The differently modulated waves represent components of a composite signal transmitted from each station. The antenna 35 which is coupled to the tunable input circuit 36 of the receiver 37 may be mounted on gimbals, or the like, to keep the same in substantially one plane with respect to the rolling and pitching of a vessel.

Fig. 3 shows a pair of reeds 38 and 39 actuated by the electromagnet 40 and arranged to vibrate in resonance with the modulation frequencies detected by receiver 37. A pair of adjustable contacts 41 and 42 are provided to make contact differentially with the reeds 38 and 39 at any desired degree of difference in vibratory amplitude of the reeds. When the adjustable contacts are arranged in close proximity to the reeds, any change of the receiver's position with respect to the position of the transmitter will cause one of the reeds to increase its vibratory amplitude thus closing its respective contact.

When one of the two circuits including the general purpose relays 43 and 44 is closed, one of the secondary work circuits is closed thus causing the actuation of any desired apparatus such as one of the alarms 45 and 46, or signal lamps 47 and 48, or solenoids 49 and 50 arranged to actuate the steering apparatus 51. When the steering apparatus solenoids 49 and 50 are connected to the relays 43 and 44 for operation thereby, a vessel can be made to steer itself automatically on any beacon signal line shown in Fig. 1 by simply adjusting the contacts 41 and 42 in accordance with the difference in vibratory amplitude of the reeds 38 and 39 as visually indicated on panel 9.

Fig. 5 represents a differential control device in which 52 is the source of two light beams 53 and 54 arranged to pass through windows 55 in the panel 56. A pair of shutters 57 and 58 are arranged to shut off the light passing through the windows when the shutters are at rest. The shutters 57 and 58 are mounted on the free ends of the reeds 39 and 38 respectively. The reeds are caused to vibrate in response to the pulsating current flowing through electromagnet 59 connected to receiver 37. When the two light beams 53 and 54 are allowed to continue through windows 55 they pass through a pair of lenses designed to cause uniform diffusion of the light over the light-sensitive surfaces of a pair of selenium cells 60 and 61. The two light-sensitive cells are arranged in two branch circuits, each branch including an inductive resistance or choke coil 62, a source of current of proper polarity 63, and a variable resistance connected common to the two branch circuits as at 64. The circuit wires 65 and 66 are connected through a reversing switch 67 and an ordinary switch 68 to the apparatus arranged to be controlled by the differential control device.

At 69 is shown a polar differential relay for actuating various types of apparatus: 70 is a center zero direct current meter used as a course indicator; and 71, Fig. 4, is a line of position projector consisting of a meter such as 70 with an extended pointer 72 having a counterbalance 73. When the control apparatus is in operation the tuned reeds 39 and 38, with their respective shutters 57 and 58, vibrate in resonance with the modulation frequencies of radio beacon 1, Fig. 1. In the course of vibration of shutters 57 and 58, the windows 55 are uncovered and impulses of light of a quantity proportional to the relative amplitude of vibration of the shutters is allowed to fall on the selenium cells 60 and 61 thereby decreasing the resistance in their respective branch circuits. By reason of the fact that the light reaching the cells is in the form of impulses of different frequencies, pulsating unidirectional currents are established in the electrical circuits. An inductive resistance or choke 62 of suitable reactance may be included in each branch circuit to damp or smooth out the current pulsations. The relative magnitudes of the currents of different polarities opposing each other in the branch circuits are proportional to the relative amplitudes of vibration of the reeds 38 and 39. Unequal vibratory amplitude of the reeds causes an unbalance of the polarized currents in the branch circuits thus causing a current flow of one polarity or other in the circuit 65 and 66 with the consequent actuation of the apparatus 69, 70, or 71 as desired. The reversing switch 67 is provided to cause the apparatus 69, 70, or 71 to be actuated in proper sequence when the relative directions of the maximum signal zones of the beacon are found reversed in their spatial distribution relative to the position of the craft. The variable resistance 65 may be utilized to unbalance the currents in the circuits when it is desired to maintain a course at a distance to one side of an equisignal zone and still keep the pointer of the indicator standing on zero center when on the desired course, as shown at 70.

Fig. 6 is a modified form of the invention in which a balance beam 74 is balanced on its axis of rotation 75 and provided with a retractile spring 76 to return the beam to its initial position as shown in the drawings. A pair of electromagnetic driving units 77 and 78, of the type shown at 103 Fig. 7, are arranged on the arms of the beam. A pair of tuned reeds 79 and 80, weighted at their free ends, are arranged with their respective driving units 77 and 78 for actuation thereby. The weights at the free ends of the reeds have been drawn disproportionately large to emphasize this feature for illustration. The reeds 79 and 80 are arranged to vibrate in resonance with the modulation frequencies $f5$ and $f6$ of beacon 3, Figs. 1 and 4. When the reeds are in vibration they develop dynamic or centrifugal forces acting in opposition on the beam 74 in the directions indicated by the arrows 81 and 82. Suitable means such as the air damper 83 is provided to damp the oscillation of the beam 74. The reeds 79 and 80 have been arranged to vibrate in planes perpendicular to the plane of rotation of the beam, or by illustration, at right-angles to the plane of vibration of the reeds shown in Fig. 7. When the beam 74 and its associated apparatus is properly balanced, this device may be operated in any position from vertical as shown, to horizontal. The beams of light 84 and 85 are reflected from their initial course by two mirrors 86 and 87 arranged on the balance beam 74. The light beams are made to pass through slits in the screens 88 and 89 which allow the light to fall differentially upon the photoelectric cells 90 and 91 in accordance with the movement of the beam 74. The two circuits 92 and 93, including amplifier grid resisters 94 and 95 and a source of polarizing voltage 96 for the photoelectric cells, represent in effect two arms of a bridge. The plate circuits 97 and 98 include resistances 99 and 100 and a source of plate current 101. The circuits 97 and 98 are balanced or unbalanced as desired by means of variable resistance 100. The circuits 97 and 98 are connected through a reversing switch 67 and an ordinary switch 68 to the pointer type indicator 70 or the line of position projector 102 as desired. When the apparatus is in operation the reeds 79 and 80, tuned to the modulation frequencies $f6$ and $f5$ respectively of beacon 3, Fig. 1, are in a state of vibration. If a craft carrying the apparatus is at the position 24, Fig. 1, signals of equal intensity will be received from beacon 3 and the dynamic actuating forces developed by the reeds 79 and 80 will be of the same magnitude, and being coupled in opposition on the balance beam 74, said beam will remain in its initial position as shown. When the craft moves to the right of the equisignal zone of beacon 3, the signal $f5$ will be received with greater intensity than signal $f6$, and in consequence thereof the vibratory amplitude of reed 80 is increased, incidentally producing a centrifugal force of greater magnitude causing the right arm of the balance to move in the direction of arrow 82. This movement of the balance 74 causes the mirror 87 to increase the angle of reflection of the light beam 85 thus causing more light to enter cell 91, and simultaneously, the mirror 86 decreases the angle of reflection of light beam 84 causing less light to pass through screen 88 thus reducing the illumination of cell 90. The bridge circuits are thus unbalanced by the quantity of light falling differentially upon the light-sensitive cells and the increased current caused to flow in circuit 98 actuates the instrument 70 by moving the pointer to the right. The line of position projector 102 is actuated in like manner when connected in the output circuit. If the craft moves to the left or opposite side of the equisignal zone the greater relative magnitude of signal $f6$ causes increased amplitude of vibration of the opposite reed 79 with the resultant unbalance of beam 74 in the direction 81, and operation of the device follows in the above described sequence, but in the opposite branch of the bridge circuit thus causing the pointer on indicator 70 to move to the left.

Fig. 7 illustrates a form of the invention comprising a balance 74 supporting an electromagnetic driving unit 103 arranged to drive an armature 104 which is connected by a pair of rods 105 to a pair of flexible supports 106. Fastened to the flexible supports are a pair of vibrating elements 107 and 108 tuned to the modulation frequencies $f4$ and $f3$ respectively which are the audio tone modulations transmitted by beacon 2, Fig. 1. The vibrating elements are weighted to increase their inherent centrifugal forces. A gear 109 mounted on the balance 74 engages a pinion 110 for the purpose of multiplying the movement of contact roller 111 which varies the resistance 112 connected common to the two arms of the differential control circuits 113 and 114. A source of current 115 and 116 is included in each arm of the control circuits and the respective currents in each arm are so polarized that they act in opposition and the control circuit carrying the greater electromotive force supplies current to the measuring device 70 with magnitude and polarity dependent upon the relative vibratory amplitudes of the elements 107 and 108. The elements 107 and 108 vibrate in resonance with the modulation frequencies of beacon 2, and by reference to Fig. 1, it will be observed that the directively transmitted signals $f3$ and $f4$ are received in reversed order since the craft is now located north of beacon 2, as shown in Fig. 4. To compensate for this reversed condition of the transmitted signals the reversing switch 67 is provided to cause the proper sequence of actuation of indicator 70 and projector 117 in accordance with the output currents of the differential control apparatus.

Fig. 4 shows the method of simultaneously and continuously projecting and integrating the lines of position to determine and indicate in miniature on a craft the positions of said craft relative to the directions of two or more directive transmitting stations. 120 may be a nautical chart, or map for use by aircraft, provided with symbols locating the transmitting stations. The projectors 71, 102, and 117 are suitable instruments responsive to the relative magnitudes of the polarized currents supplied thereto by their respective associated control circuits. While the projectors are shown to have individual freedom of motion, I contemplate linking the several projectors to a common pointer or recorder pen in the manner and for the purposes well known in the art, when desired. The line of position projectors 71, 102 and 117 are portable and may be shifted around on the chart to any desired positions to use any desired combination of transmitting stations for determining and indicating positions of the craft in miniature. The projectors may be provided with sharp legs to keep them from moving out of position on the chart when centered over the beacon symbols, and each of the projectors are given identifying colors corresponding with the color scheme used in the signal system. In practice, the pointers 72, 118 and 119 are individually free to move over the chart in accordance with the relative intensities of the characterized signals propagated by the stations which they individually represent. In practice the craft may be steered automatically along a particular course, as indicated by pointer 72 for example, by utilizing the polar differential relay 69, Fig. 5, associated with the steering apparatus shown at 49, 50 and 51. The progress of the craft along the automatically steered course 72 may be observed and determined by means of pointer 118. The pointer 119, projecting lines of position from beacon 3, may be brought into use when conditions of navigation require the same.

While the pointers shown in the drawing are suitable for charts of small scale, it is my intention with respect to charts of large scale, to substitute suitable apparatus with each of the projectors 71, 102 and 117 for projecting narrow beams of light over the chart in lieu of the pointers, and determining position of the craft by intersection of the several light beams.

The method illustrated at Fig. 4, and embodied in the associated apparatus, may be readily applied and adapted for use on aircraft to indicate the position of the craft over a landing field to assist in landing the craft. When the method is utilized for ferry service, or where craft move constantly over limited areas, the chart and associated projectors will be permanently mounted in a vertical position in view of the pilot. My invention as disclosed in Figs. 1 to 4, together with the intermediate apparatus, constitutes the means for carrying into effect the proposed radio signal system originally described in my publication, "The Fog Problem in Navigation and Marine Traffic Control", copyrighted 1926. The use of my apparatus and method for radiodynamic control of distant mechanisms, and for performing the general functions of remote type instruments, is contemplated and such new uses are within the scope of my invention.

Fig. 8 shows a form of the invention combining a course indicator and a differential relay operable in any position when properly balanced. 74 is a balance beam supporting a pair of Rochelle salt crystals 121 and 122 which are equivalents of the electromagnetic driving units heretofore considered, but cheaper, simpler in construction, and more efficient vibrators. A pair of tuned reeds 123 and 124 are mounted on the crystals for actuation thereby. In this particular showing the crystals and reeds are arranged to vibrate in planes perpendicular to the plane of rotation of the beam 74. The mechanical deflection of the crystal is caused by an electrostatic field produced in the crystal by the applied voltage. The deflection of the crystal is proportional to the magnitude of the applied potential and the frequency of vibration of the crystals 121 and 122 is determined by the frequency of pulsation of the applied current from the receiver 37. The tuned reeds 123 and 124 vibrate selectively in response to the mechanical deflections of the respective crystals to which they are attached. The output voltages of the receiver 37 are applied to the crystals by means of electrodes 125 and 126, the metal balance 74 forming part of the circuit of electrodes 125. The balance is provided with the usual retractile spring, and a gear 109 is mounted on the balance to engage pinion 110 which moves the pointer 127. An adjustable trolley contactor 128 is arranged to make contact differentially with a pair of arc-segment sliding contacts 129 and 130 in accordance with the differential movement of balance 74. The contacts 128, 129 and 130 are connected through reversing switch 67 to the electric steering apparatus 49, 50, and 51 for automatically steering a craft in accordance with the directive radio beacon signals.

Fig. 9 shows the balance 74 arranged to drive a train of gears to actuate the course indicator pointer 127, and this mechanism constitutes a part of the apparatus shown in Fig. 8. Two sets of gears 131 and 132, arranged for rotation in opposite directions, are provided for the purpose of driving the pinion 133 in one direction or another relative to the movement of the balance beam 74. The pinion is movably keyed to the shaft 134 which moves the pointer 127. The pinion 133 is provided with a collar which is grooved to engage the fork of the gear shift 135 accessible on the panel 136. The pinion is so arranged that it can not get out of mesh with both sets of driving gears at the same time. The balance 74 operates in the same manner as the balance beams in Figs. 6 and 7 and produces the same general result without the use of the bridge circuits described. The gear shift 135 performs the function of the reversing switch 67 when the directively transmitted signals are found reversed relative to the position of the craft on a given radio course.

What I claim as my invention and desire to secure by Letters Patent of the United States is:

1. In combination, a plurality of vibratory members carried by a craft, each of said members having a natural period of vibration, actuating means therefor, means for supplying to said actuating means currents transmitted from a remote station having different frequencies and having relative intensity dependent upon the position of said craft with reference to a predetermined course, the natural period of each of said members corresponding to one of said frequencies whereby each member vibrates with amplitude dependent upon the intensity of the supplied current having its respective frequency, photo-electric means including a source of actuating energy therefor adapted and arranged in operating relation with said vibratory members for controlling an electromotive force having magnitude dependent upon the amplitude of vibration of the respective vibratory members, and means responsive to the magnitude and polarity of said electromotive force.

2. The method of effecting differential control, which includes the steps of receiving a plurality of primary control currents having different frequencies and varying relative magnitudes, establishing resonant mechanical vibrations with each of said received primary currents, utilizing the dynamic forces developed by said vibrations to influence photoelectric effects adapted to vary the magnitudes of a plurality of opposing secondary control currents, and effecting the desired control by means of the differential resultant control current having magnitude and polarity dependent upon the relative magnitudes of the primary control currents received.

3. The method of comparing electromotive forces, which includes the steps of receiving a plurality of distinctively characterized electromotive forces, establishing mechanical vibrations with each of said characterized electromotive forces, applying in opposition the mechanical forces developed by said vibrations, utilizing the differential resultant of said applied forces to alter the magnitudes of a plurality of opposing secondary electromotive forces, and producing a manifestation of the relative magnitudes of said characterized electromotive forces by means of the differential resultant of said opposing secondary electromotive forces.

4. The method of comparing electromotive forces, which includes the steps of receiving a plurality of distinctively characterized electromotive forces, establishing mechanical vibrations with each of said characterized electromotive forces, applying in opposition the mechanical forces developed by said vibrations, and making the differential resultant of said applied forces manifest to indicate the relative magnitudes of said characterized electromotive forces.

5. The combination comprising means for transmitting directional radio waves modulated with different frequencies in different directions in their spatial distribution, a receiving device, a plurality of light-sensitive cells arranged respectively in a plurality of opposing control circuits, a source of light, mechanically selective means actuated by the output currents of said receiving device for varying the amount of light reaching said cells respectively, and apparatus connected to said control circuits for actuation thereby.

6. In control apparatus the combination including a source of currents of varying amplitudes and different frequencies, a plurality of light-sensitive cells arranged respectively in a plurality of branch circuits having opposing electromotive forces, a source of light for said cells, a plurality of differently tuned vibratile elements arranged in opposed relation with a movably supported member for causing said member to move differently in accordance with the relative magnitudes of the centrifugal forces developed by said vibratile elements, means responsive to said currents for actuating said elements, means actuated by said movable member for varying the amount of light arranged to fall on said cells respectively, and desired apparatus connected to said branch circuits for actuation thereby.

7. In a system utilizing a directive radio transmitting station emitting a plurality of radio waves directed in different directions and modulated with different frequencies, means for receiving and detecting said waves, a plurality of light-sensitive cells and a source of light therefor, a plurality of resonant elements respectively tuned to the modulation frequencies of said waves for varying the amount of light reaching each of said cells respectively, means connected to said receiving means for driving said resonant elements, and means connected to said cells for controlling desired apparatus.

8. Means for automatically controlling apparatus in accordance with directive radio beacon signals having different modulation frequencies, including in combination a receiving device, a plurality of light-sensitive cells arranged respectively in a plurality of opposing control circuits including a differential relay, a source of light, a plurality of resonant elements respectively tuned to the different modulation frequencies of the beacon signals for varying the amount of light reaching each of said cells respectively, means actuated by said receiving device for driving said resonant elements, and means actuated by said differential relay for controlling apparatus in accordance with predetermined characteristics of the received signals.

9. In a system for controlling apparatus in accordance with the relative strength of a plurality of sustained currents having different frequencies, the combination including a plurality of vibratile members having different natural vibratory periods corresponding to the frequencies of said currents, means for causing said members to vibrate in resonance with the pulsations of said currents, a plurality of branch circuits including means for supplying opposing electromotive forces in said circuits, a variable resistor included in each branch of said circuits, means actuated by said vibratile members for differentially varying the respective resistances in said branch circuits in accordance with the relative vibratory amplitude of said members, and desired apparatus operatively connected to said branch circuits for differential actuation thereby.

10. In a system for indicating the relative amplitudes of two potentials, in combination, a movably supported member, a pair of vibratile elements for actuating said member, means actuated by said potentials for causing said elements to vibrate and produce centrifugal forces acting in opposition on said member, a light-sensitive cell arranged in each branch of a bridge circuit including means for supplying opposing electromotive forces in each branch thereof, a source of light, means actuated by said movable member to vary the light reaching the cells differentially, and an indicator connected with said bridge circuit.

11. The method of comparing electromotive forces, which includes the steps of receiving a plurality of electromotive forces of varying relative magnitudes and having different frequencies, establishing resonant mechanical vibrations respectively proportional to the amplitudes of said received electromotive forces to produce centrifugal forces, applying in opposition the centrifugal forces produced by said vibrations, and making the differential resultant of said applied forces manifest to indicate the relative magnitudes of said electromotive forces.

12. The combination including means for transmitting directional signals having different frequencies and different relative amplitudes in their spatial distribution, means for receiving the signals, a plurality of electro-mechanically vibratile elements responsive to the output currents of said receiving means, photo-electric means responsive to the movement of said elements, and work circuits energized by said photo-electric means.

THEOPHILE E. BROCKSTEDT.